(12) United States Patent
Whitehead

(10) Patent No.: US 7,973,878 B2
(45) Date of Patent: *Jul. 5, 2011

(54) DIFFUSER FOR LIGHT FROM LIGHT SOURCE ARRAY AND DISPLAYS INCORPORATING SAME

(75) Inventor: Lorne A. Whitehead, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 912 days.

This patent is subject to a terminal disclaimer.

(21) Appl. No.: 11/831,915

(22) Filed: Jul. 31, 2007

(65) Prior Publication Data

US 2007/0268461 A1    Nov. 22, 2007

Related U.S. Application Data

(63) Continuation of application No. 11/572,812, filed as application No. PCT/CA2005/001111 on Jul. 15, 2005, now Pat. No. 7,583,331.

(60) Provisional application No. 60/591,087, filed on Jul. 27, 2004.

(51) Int. Cl.
*G02F 1/1335* (2006.01)
*F21V 7/00* (2006.01)
*G02B 5/02* (2006.01)

(52) U.S. Cl. ............... 349/64; 349/61; 349/67; 349/68; 362/247; 359/599

(58) Field of Classification Search ............ 349/64, 349/61, 67, 68; 362/247; 359/599
See application file for complete search history.

(56) References Cited

U.S. PATENT DOCUMENTS

| 5,143,433 | A | 9/1992 | Farrell |
| 5,639,158 | A | 6/1997 | Sato |
| 5,748,828 | A | 5/1998 | Steiner et al. |
| 6,404,131 | B1 | 6/2002 | Kawano et al. |
| 6,421,103 | B2 | 7/2002 | Yamaguchi |
| 6,517,914 | B1 | 2/2003 | Hiraishi et al. |
| 6,832,037 | B2 | 12/2004 | Aylward et al. |
| 6,888,663 | B2 | 5/2005 | Bourdelais et al. |
| 6,917,396 | B2 | 7/2005 | Hiraishi et al. |
| 7,050,219 | B2 | 5/2006 | Kimura |
| 7,052,152 | B2 | 5/2006 | Harbers et al. |
| 7,583,331 | B2 * | 9/2009 | Whitehead ............ 349/64 |
| 2002/0097578 | A1 | 7/2002 | Greiner |

(Continued)

FOREIGN PATENT DOCUMENTS

CN    1378653 A1    11/2002

(Continued)

OTHER PUBLICATIONS

Seetzen, H. et al., "A High Dynamic Range Display Using Low and High Resolution Modulators", SID 03 DIGST, 2003, pp. 1450-1453.

(Continued)

*Primary Examiner* — Mike Qi

(57) ABSTRACT

An optical structure placeable between a backlight array of point light sources and a planar display. The structure distributes light emitted by the point light sources to uniformly illuminate the plane of the display, without introducing significant viewing parallax. The emitted light is partially collimated within a preferred angular viewing range, maximizing the display's luminance when viewed from the normal direction. The structure is highly reflective, such that a substantial portion of any non-emitted light rays are internally reflected by the structure, increasing the likelihood that those rays will be subsequently emitted by the structure.

12 Claims, 2 Drawing Sheets

U.S. PATENT DOCUMENTS

| | | |
|---|---|---|
| 2003/0002153 A1 | 1/2003 | Hiraishi et al. |
| 2003/0090455 A1 | 5/2003 | Daly |
| 2003/0235050 A1 | 12/2003 | West et al. |

FOREIGN PATENT DOCUMENTS

| | | |
|---|---|---|
| CN | 1474201 A1 | 2/2004 |
| EP | 0684423 A2 | 11/1995 |
| EP | 1431653 A2 | 6/2004 |
| EP | 1521235 A2 | 4/2005 |
| JP | 08-111545 | 4/1996 |
| JP | 08-297282 | 11/1996 |
| JP | 11-326610 | 11/1999 |
| JP | 2000-338311 | 12/2000 |
| JP | 2001-053341 | 2/2001 |
| JP | 2002-040213 | 2/2002 |
| JP | 2002-214412 | 7/2002 |
| JP | 2002-231037 | 8/2002 |
| JP | 2005-115372 | 4/2005 |
| WO | 01/14790 A1 | 3/2001 |
| WO | 01/27663 A1 | 4/2001 |
| WO | 02/069030 A2 | 9/2002 |
| WO | 02/079862 A2 | 10/2002 |
| WO | 03/077013 A2 | 9/2003 |

OTHER PUBLICATIONS

International Search Report for International Application No. PCT/CA2005/001111, International Searching Authority, Nov. 14, 2005.

* cited by examiner

DIFFUSER FOR LIGHT FROM LIGHT SOURCE ARRAY AND DISPLAYS INCORPORATING SAME

CROSS REFERENCE TO RELATED APPLICATIONS

This application is a continuation of U.S. patent application Ser. No. 11/572,812 (accorded the filing date of 26 Jan. 2007), which is the U.S. National Stage of International Application No. PCT/CA05/00111 filed 15 Jul. 2005, which claims the benefit of the filing date of U.S. provisional patent application No. 60/591,087 filed on 27 Jul. 2004.

TECHNICAL FIELD

This invention pertains to displays of the type which have an array of light sources serving as a backlight. Light from the light sources is distributed to achieve suitably uniform spatial and angular illumination of the display, while maintaining high luminance in the display's normal viewing direction.

BACKGROUND

This invention pertains to backlights for displays which have a transmission-type light modulator illuminated by a backlight. Examples of such displays include some liquid crystal displays (LCDs) as well as high dynamic range displays of the type disclosed in international patent publication WO 02/069030 published 6 Sep. 2002 and in international patent publication WO 03/077013 published 18 Sep. 2003, both of which are incorporated by reference herein.

High dynamic range displays like those disclosed in the above publications incorporate a light source layer (which may be called a "backlight") and a display layer that includes a light modulator. The backlight is controlled to produce a light pattern that represents a comparatively low-resolution version of an image to be displayed. The low-resolution image is modulated by the display layer to provide a comparatively high resolution image for perception by an observer.

The backlight typically comprises an array of point type actively modulated light sources, such as light emitting diodes (LEDs). The display layer, which is positioned and aligned in front of the backlight, may be a liquid crystal display (LCD) panel or the like. Maintenance of a relatively small separation distance between the two layers allows light emitted by adjacent light sources of the backlight to merge smoothly into one another such that each pixel of the high resolution image is illuminated. Suitable image compensation techniques may be applied to remove undesirable image blurring artifacts.

In many planar illumination applications (e.g. not only in planar displays as mentioned above, but also in some general illumination situations) it is desirable to uniformly illuminate (i.e. backlight) a plane. Multiple LEDs arranged in an array can be used in such applications since they provide a robust, low-power alternative to incandescent light sources. However, LEDs provide only point source illumination, not uniform planar illumination. It is consequently necessary to somehow distribute the light emitted by LEDs of a LED array so as to uniformly illuminate the plane.

In display applications it is also desirable to avoid parallax (apparent changes in the direction of an object, due to changes in the observer's position which correspond to different lines of sight to the object) between each LED and the illuminated display area directly in front of the LED. Otherwise, an observer will perceive changes in that area if the area is viewed from different angles, which is undesirable.

The parallax problem has prevented attainment of uniform planar illumination in situations where each point type light source interacts in some manner with the display area directly in front of the light source, as is the case for LED/LCD type high dynamic range displays in which each LED corresponds to a specific pixel or cluster of pixels on the LCD display. In such displays each LED should primarily illuminate the LCD pixels directly in front of the LED. This illumination characteristic should remain substantially invariant as the observer's viewing angle changes.

It is also desirable that the light emitted by the backlight be partially collimated within a preferred angular viewing range, namely within about 25° of the display's normal direction in order to maximize the display's luminance when it is viewed from the normal direction. It is additionally desirable that the optical structure as a whole (i.e. anything between the light source layer and the display layer) be reasonably reflective, in order to maximize the efficiency of the reflective polarizers incorporated in state-of-the-art LCD displays and thereby minimize light loss due to polarization.

SUMMARY OF THE INVENTION

This invention provides displays that include an optical structure between a backlight array of light sources and a display layer. The light sources may be point light sources such as light emitting diodes (LEDs). The structure distributes light emitted by the point light sources. The invention also provides optical structures that may be used to distribute light from arrays of point sources and related methods.

Various aspects of the invention and features of embodiments of the invention are described below.

BRIEF DESCRIPTION OF THE DRAWINGS

The appended drawings illustrate non-limiting example applications of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
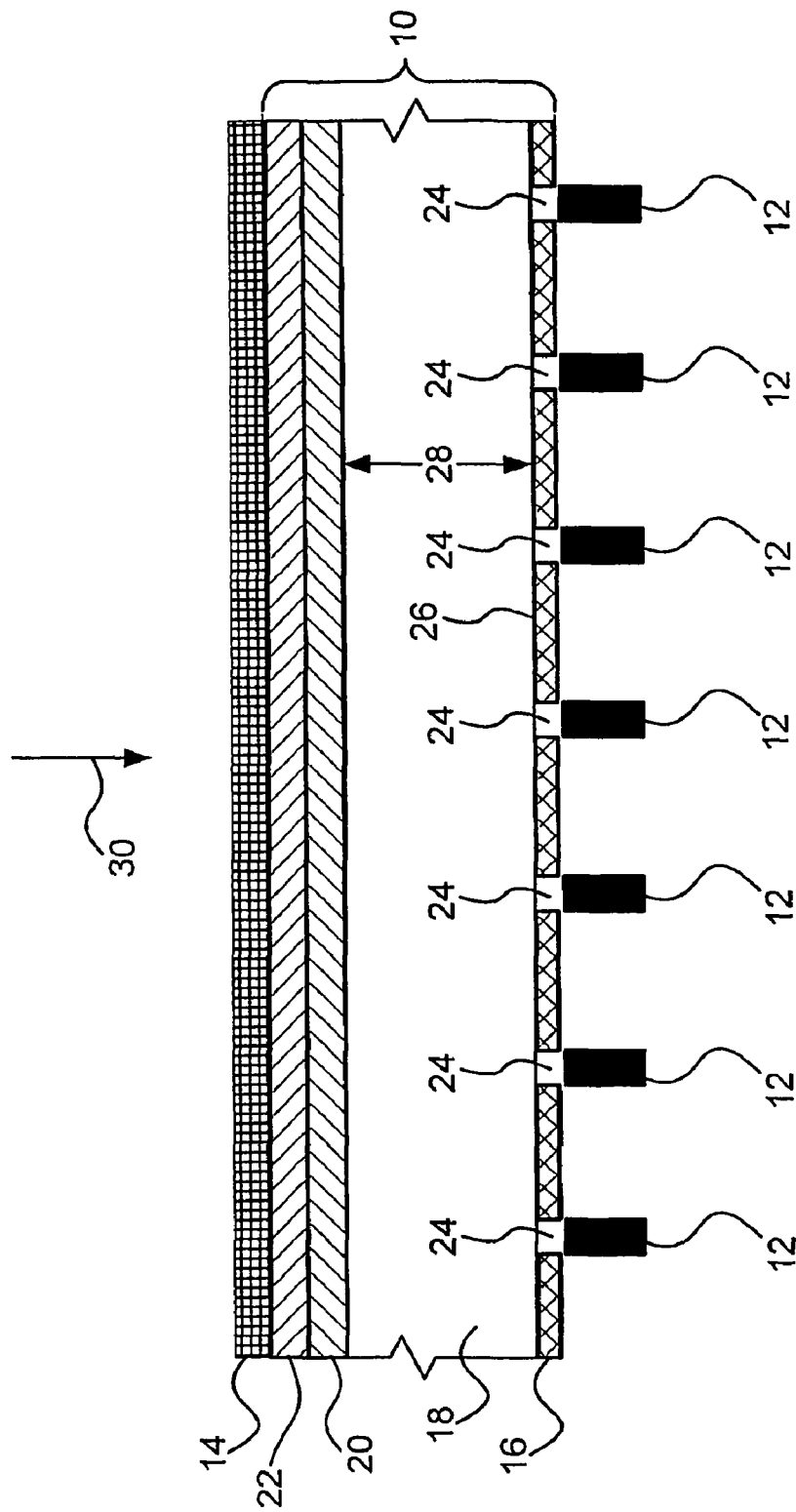
FIG. 1 is a greatly enlarged not-to-scale cross-sectional side elevation view of a fragmented portion of a planar light distribution structure.

FIG. 1 depicts a layered planar light distribution structure 10. Some light sources 12, which may be LEDs, of a display backlight 13, and a display panel 14, which may comprise an LCD panel or other light modulator, are shown schematically in FIG. 1. Light distribution structure 10 incorporates a rear reflector 16, a light-diffusing volume 18, an optional reflective polarizer 20, and an optional angularly selective light transmitter 22.

Rear reflector 16 has an array of transparent regions 24 at locations corresponding to LEDs 12 of the backlight array. Transparent regions 12 may comprise apertures or windows that are substantially transparent to at least some light emitted by LEDs 12. One transparent region 24 is provided for each LED 12. Regions 24 are sized and aligned to match the size and alignment of LEDs 12. For example, LEDs 12 may be arranged in a rectangular array, a hexagonal array, a square array, or the like, and regions 24 may be arranged in a pattern that matches the arrangement of LEDs 12. Regions 24 may also be shaped to match LEDs 12.

In the illustrated embodiment, LEDs 12 lack lenses. Such lensless LEDs emit light approximately in a Lambertian pattern (i.e. the emitted light has an intensity that varies with viewing angle in such a way that the intensity is directly proportional to the cosine of the viewing angle). In alternative embodiments, LEDs or other light sources may have lenses or may be otherwise constructed to emit light in a non-Lambertian manner. Each region 24 transmits light emitted by the corresponding, immediately adjacent LED 12 into diffusing volume 18.

LEDs 12 may be outside diffusing volume 18, as shown. In the alternative, LEDs 12 could extend through regions 24, which may be apertures, and project slightly into diffusing volume 18.

The face 26 of rear reflector 16 that faces into diffusing volume 18 is highly reflective. Face 26 is preferably at least partially specularly reflective (i.e. the angle of reflection substantially equals the angle of incidence, in contrast to a diffuse reflector) and may be substantially entirely specularly reflecting. Perforated "radiant mirror film" available from 3M Specialty Film and Media Products Division, St. Paul, Minn. is one example of a material that can be used to form rear reflector 16.

The thickness dimension 28 of light diffusing volume 18 (which may be an air gap in the simplest case) is preferably minimized, while retaining sufficient thickness that light rays passing from rear reflector 16 into diffusing volume 18 are asymmetrically diffused (i.e. light rays are scattered in many directions) before the rays pass through reflective polarizer 20. Consequently, any directional characteristic of light rays which enter diffusing volume 18 is essentially absent from light rays which exit diffusing volume 18.

Thickness dimension 28 can be reduced in cases where diffusing volume 18 has an anisotropic scattering coefficient such that light rays which are substantially parallel to normal viewing direction 30 are more intensely scattered than light rays which are substantially perpendicular to normal viewing direction 30. Such anisotropic scattering can be achieved by placing, within diffusing volume 18, multiple layers of a thin, weakly light-scattering sheets 19 (See FIG. 2, not shown in FIG. 1). Partial reflection of light at surfaces of sheets 19 causes substantial scattering of light traveling in a direction substantially parallel to normal viewing direction 30. Sheets 19 may be made of a suitable transparent polymer material, for example. Anisotropic scattering could also be caused by providing within diffusing volume 18 a transparent medium such as a suitable resin or gel doped with white particles (e.g. particles of paint pigment or the like) or other diffusely-reflecting particles.

Optional reflective polarizer 20 (which has a polarization characteristic matched to that of reflective polarizers incorporated in LCD display panel 14) reflects rearwardly into diffusing volume 18 light rays having polarization characteristics which are unmatched to the polarization characteristics of polarizers incorporated in LCD display panel 14. Such unsuitably polarized light rays undergo further diffusion within diffusing volume 18 and are again reflected ("recycled") by rear reflector 16 toward optional reflective polarizer 20.

Diffusion within diffusing volume 18 randomizes the polarization characteristics of recycled light rays such that some of the recycled rays are eventually able to pass through reflective polarizer 20 toward LCD display panel 14. Any remaining unsuitably polarized light rays are again recycled as aforesaid by reflective polarizer 20, diffusing volume 18, and rear reflector 16 until the polarization characteristics of the recycled rays matches that of polarizer 20 so that the recycled rays can pass through reflective polarizer 20 toward LCD display panel 14.

Optional angularly selective light transmitter 22, may be formed by crossing, at 90° to each other, the microreplicated prism structures on two parallel sheets of Vikuiti™ Brightness Enhancement Film available from 3M Specialty Film and Media Products Division, St. Paul, Minn. Light transmitter 22 selectively transmits partially collimated light rays toward LCD display panel 14 in a direction substantially parallel to normal viewing direction 30, while rearwardly reflecting a substantial portion of any non-emitted light rays back toward reflective polarizer 20 and rear reflector 16 so that the non-emitted rays may be further reflected ("recycled") for subsequent emission through light transmitter 22.

Layered planar light distribution structure 10 is highly efficient in the sense that it is characterized by low light absorption losses. If rear reflector 16, any material within diffusing volume 18, reflective polarizer 20, if present, and angularly selective light transmitter 22, if present, are made of materials that do not substantially absorb the light emitted by LEDs 12, almost all light rays emitted by LEDs 12 into structure 10 can eventually be emitted through structure 10 toward LCD display panel 14. Unwanted image artifacts are significantly reduced and, in some cases, substantially eliminated, due to the structure's highly diffuse character.

For clarity and conciseness various elements which can be provided by those skilled in the art are not described in detail herein. For example, a display incorporating an optical structure as described herein would include suitable driving circuits to cause LEDs 12 or other light emitters to emit light. Such circuitry may optionally permit the brightness of LEDs 12 or other light sources to be individually modulated. Any suitable driving circuits may be used including those known to those of skill in the art. Further, a display typically has suitable driving circuits for operating individual pixels in a display panel to modulate light according to image data corresponding to an image to be displayed on the display. Suitable display panel driving circuits are also known to those skilled in the field of this invention. Consequently, the driving circuitry for LEDs 12, the driving circuitry for display panel 14 and other well-understood elements such as power supplies and the like are not described in detail herein.

Where a component (e.g. a member, part, assembly, sheet, collimator, reflector, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Figure 2:
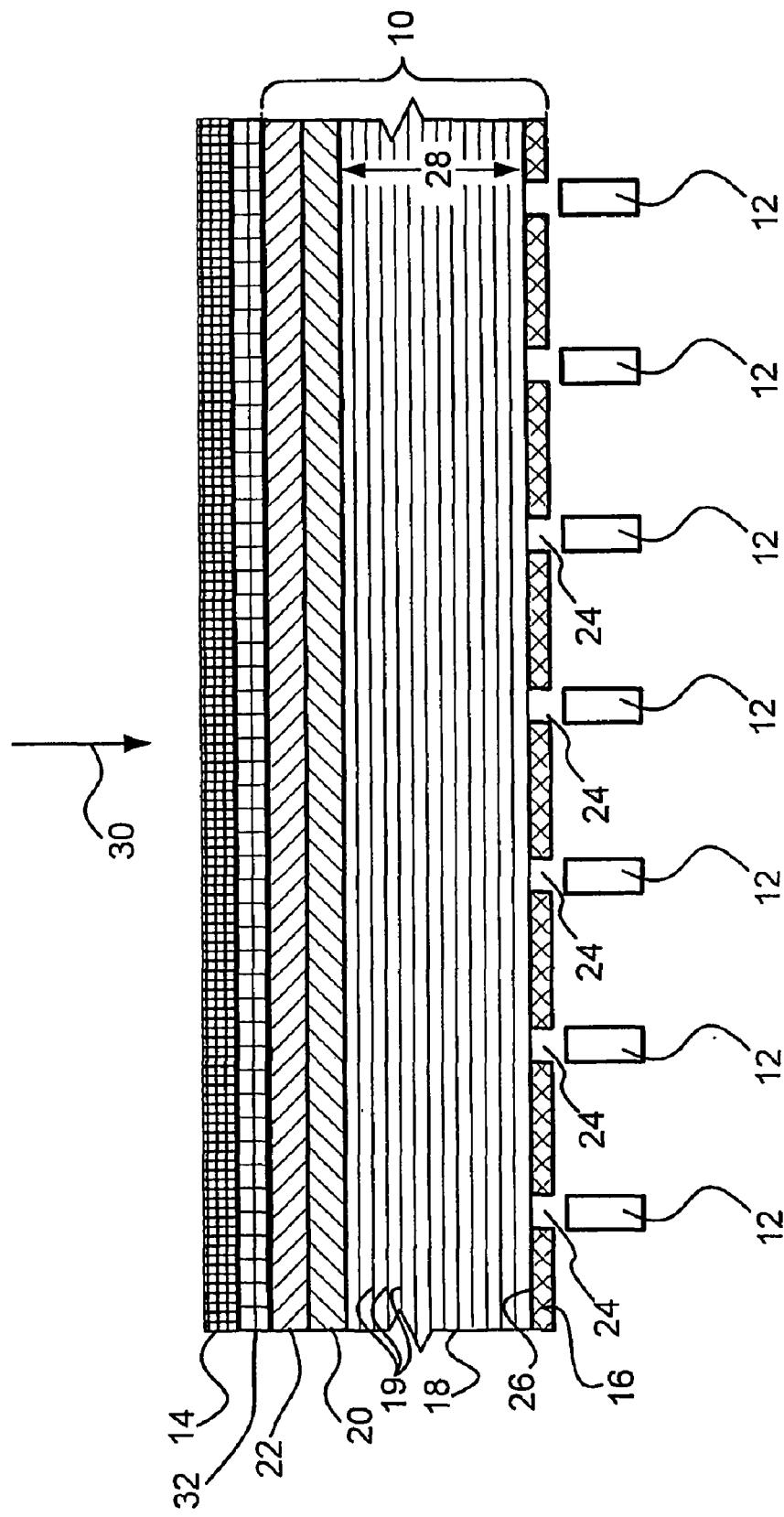
FIG. 2 is a greatly enlarged not-to-scale cross-sectional side elevation view of a fragmented portion of another planar light distribution structure having an additional diffuser.

As will be apparent to those skilled in the art in the light of the foregoing disclosure, many alterations and modifications are possible in the practice of this invention without departing from the spirit or scope thereof. For example:

either or both of reflective polarizer 20 and angularly selective light transmitter 22 may be omitted—satisfactory results can be obtained by providing only rear reflector 16 and light diffusing volume 18 in light distribution structure 10. It is however preferable to include reflective polarizer 20 in order to increase the light output capability of structure 10, since unsuitably polarized light rays are otherwise lost. It is also preferable to include angularly selective light transmitter 22 in order to increase the brightness of light emitted by structure 10—albeit at the expense of a reduced viewing angle, since light transmitter 22 partially collimates light which passes through it. This can be offset by providing an additional diffuser 32 as shown in FIG. 2 between light transmitter 22 and LCD display panel 14. Additional diffuser 32 increases the viewing angle by laterally diffusing light rays which are narrowly diffused by passage through light transmitter 22.

When reflective polarizer 20 and angularly selective light transmitter 22 are both present they may be arranged in either order.

It is not necessary that rear reflector 16 be perfectly flat. Rear reflector 16 could be bumpy on a small scale (i.e. have a surface structure). The faces of diffusing volume 18 should be generally parallel to one another so that light will be emitted substantially uniformly from diffusing volume 18.

While a number of example aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true scope.

What is claimed is:

1. An optical structure for distributing light emitted by light sources of a plurality of point light sources, the structure comprising:
   a reflector having an array of apertures for passing light from the point light sources into the structure; and
   a light diffuser for diffusing light which passes through the apertures, the light diffuser anisotropically scattering light that interacts with the light diffuser.

2. An optical structure according to claim 1 comprising an angularly selective light transmitter for partially collimating, within a preferred angular viewing range, light which passes through the light diffuser.

3. An optical structure according to claim 2 comprising a reflective polarizer for polarizing light which passes from the light diffuser to the angularly selective light transmitter.

4. An optical structure according to claim 3 wherein the reflective polarizer polarizes light rays to match the polarization of a display panel oriented parallel to the angularly selective light transmitter.

5. An optical structure according to claim 2 wherein the angularly selective light transmitter selectively emits partially collimated light rays in a direction substantially normal to the planar light distribution structure, and rearwardly reflects a substantial portion of any non-emitted light rays.

6. An optical structure according to claim 1 wherein each of the apertures is sized, shaped and aligned to match the size, shape and alignment of a corresponding one of the point light sources.

7. An optical structure according to claim 1 wherein the reflector comprises a highly reflective outward surface.

8. An optical structure according to claim 7 wherein the outward surface of the reflector is at least partially specularly reflective.

9. An optical structure according to claim 1 wherein the light diffuser has an anisotropic scattering coefficient such that light rays which are substantially parallel to a direction normal to the planar light distribution structure are more intensely scattered than light rays which are substantially perpendicular to a direction normal to the planar light distribution structure.

10. An optical structure according to claim 1 comprising a plurality of layers of a thin, weakly light-scattering sheet material within the diffuser.

11. A display comprising an array of point light sources, a display panel, and an optical structure according to claim 1 disposed between the point light sources and the display panel.

12. A display according to claim 11 wherein the display panel comprises an LCD display panel.

* * * * *